(12) United States Patent
Du et al.

(10) Patent No.: US 8,559,725 B2
(45) Date of Patent: Oct. 15, 2013

(54) METHOD AND APPARATUS FOR EXTRACTING RASTER IMAGES FROM PORTABLE ELECTRONIC DOCUMENT

(75) Inventors: Cheng Du, Beijing (CN); Wenhui Xu, Beijing (CN); Fumihiro Hasegawa, Tokyo (JP); Koichi Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 689 days.

(21) Appl. No.: 12/785,004

(22) Filed: May 21, 2010

(65) Prior Publication Data

US 2010/0299535 A1  Nov. 25, 2010

(30) Foreign Application Priority Data

May 25, 2009  (CN) .......................... 2009 1 0141741

(51) Int. Cl.
G06K 9/46 (2006.01)
G06K 9/66 (2006.01)
G06K 9/34 (2006.01)
G06K 9/36 (2006.01)

(52) U.S. Cl.
USPC ............ 382/190; 382/180; 382/291; 382/294

(58) Field of Classification Search
USPC .................. 382/180, 190, 282, 284, 294, 291
See application file for complete search history.

(56) References Cited

U.S. PATENT DOCUMENTS

| 5,832,530 | A | 11/1998 | Paknad et al. | |
| 6,801,673 | B2 * | 10/2004 | Chao et al. | 382/282 |
| 7,072,061 | B2 * | 7/2006 | Blair et al. | 358/1.15 |
| 7,305,612 | B2 * | 12/2007 | Chakraborty | 715/221 |
| 2008/0055623 | A1 * | 3/2008 | Piersol et al. | 358/1.13 |
| 2010/0020351 | A1 * | 1/2010 | Ishizuka | 358/1.15 |

OTHER PUBLICATIONS

Office Action issued Jun. 4, 2012 in Chinese Patent Application No. 200910141741.0 with English language translation.
Jin-tao Wang, et al., "Extraction of recognizable images from PDF file", Computer Engineering and Design, vol. 27, No. 9, May 31, 2006, pp. 1539-1541 with English language translation.

* cited by examiner

*Primary Examiner* — John Strege
(74) *Attorney, Agent, or Firm* — Oblon, Spivak, McClelland, Maier & Neustadt, L.L.P.

(57) ABSTRACT

A disclosed method for extracting a raster image of a page from a portable electronic document that includes (a) acquiring commands and resources of the raster image of the page by analyzing a format of the portable electronic document, (b) extracting first and second candidate raster images by processing the commands and the resources of the raster image of the page, (c) integrating the first and second candidate raster images as an integrated candidate raster image provided that the first and second candidate raster images are linked together, and (d) removing a pseudo-raster image from the integrated candidate raster image.

12 Claims, 9 Drawing Sheets

METHOD AND APPARATUS FOR EXTRACTING RASTER IMAGES FROM PORTABLE ELECTRONIC DOCUMENT

BACKGROUND OF THE INVENTION

1. Field of the Invention

The present invention generally relates to a method and an apparatus for extracting a raster image from a portable electronic document, and more specifically to a method and an apparatus for extracting a raster image from a portable electronic document by analyzing a format of the portable electronic document.

2. Description of the Related Art

Portable electronic documents, such as portable electronic document format (PDF) documents or PostScript (PS) format documents, are widely used in daily clerical work. The portable electronic documents have an electronic document format for displaying documents, and such portable electronic documents are generated and output in a manner independent of the application software, hardware, and operating system.

The portable electronic documents define recording systems for two types of raster images, namely Inline-images and Image XObjects. PDF commands and image data corresponding to the Inline-images are all stored in a contents stream section of a page, whereas PDF commands corresponding to the Image XObjects are stored in a contents stream section of a page and image data corresponding to the image XObjects are stored in a resources section of the page.

A raster image is called a bitmap image that is displayed based on pixels in the image, and is discriminated from a vector image obtained by plotting a sequence of control points in the image and connecting paths between the plotted control points. It is generally known that extracting components such as paragraphs and tables from the portable electronic documents is a difficult task. For example, when a raster image is extracted from a PDF file using Adobe Acrobat (Trademark) software, the extracted image often results in undesired images. With Adobe Acrobat (Trademark) software, an Inline raster image embedded in the PDF document is difficult to be extracted. For example, Adobe Acrobat Reader (Trademark) can only extract an image XObject raster image from the PDF file.

Generally, a visually intact raster image in the PDF file is not composed of an intact image but of segments of the image that are linked together; that is, plural linked image segments are extracted from the image by Adobe Acrobat (Trademark) software so as to be rendered as an intact raster image.

Further, borders in a table are represented with plural long and thin raster images in the PDF file, which can be extracted by Adobe Acrobat (Trademark) software; however, such long and thin raster images are generally not perceptually significant contents of detection or search. For example, since such long and thin raster images contain little significant characteristics for detection or search, users generally make no attempts for detecting or searching for such perceptually insignificant long and thin raster images in the PDF file.

U.S. Pat. No. 5,832,530 A discloses a technology for extracting a word in a PDF file. This technology involves identifying a word composed of characters in text segments in the PDF file by detecting a break word (space) between words, or by detecting a space between adjacent characters in text segments. If the space between the adjacent characters in text segments exceed a predetermined threshold value, adjacent characters in text segments are identified as two words. In the technology disclosed in U.S. Pat. No. 5,832,530 A, an input is a PDF file and an output is a collection of words.

U.S. Pat. No. 6,801,673 B2 discloses a technology involving a tool for extracting content segments from a PDF file. In this technology, a user specifies an intended extraction region with a rectangular box, extracts the specified rectangular extraction region in a PDF browser interface, and stores the extracted content segment (i.e., rectangular extraction region) as a new PDF file. In this technology, although a PDF command in the PDF file is extracted and pasted, a document content having perceptually insignificant information on an image or a table is not extracted.

SUMMARY OF THE INVENTION

It is a general object of at least one embodiment of the present invention to provide a method and an apparatus for extracting a raster image in a portable electronic document by analyzing a format of the portable electronic document that substantially eliminates one or more problems caused by the limitations and disadvantages of the related art.

According to one embodiment, there is provided a method for extracting a raster image of a page from a portable electronic document that includes (a) acquiring commands and resources of the raster image of the page by analyzing a format of the portable electronic document; (b) extracting first and second candidate raster images by processing the commands and the resources of the raster image of the page; (c) integrating the first and second candidate raster images as an integrated candidate raster image provided that the first and second candidate raster images are linked together; and (d) removing a pseudo-raster image from the integrated candidate raster image.

According to one embodiment, there is provided an apparatus for extracting a raster image of a page from a portable electronic document that includes a document analysis device configured to acquire commands and resources of the raster image of the page by analyzing a format of the portable electronic document; a candidate raster image extraction device configured to extract first and second candidate raster images by processing the commands and the resources of the raster image of the page; a raster image integration device configured to integrate the first and second candidate raster images as an integrated candidate raster image provided that the first and second candidate raster images are linked together; and a pseudo-raster image removal device configured to remove a pseudo-raster image from the integrated candidate raster image.

These and other advantages of the features of embodiments will be apparent to those skilled in the art upon a reading of the following detailed description and a study of the accompanying drawings.

BRIEF DESCRIPTION OF THE DRAWINGS

FIGS. 8A and 8B are views illustrating integrated examples of the linked raster images, in which FIG. 8A illustrates linked raster images before integration while FIG. 8B illustrates raster images after integration.

DESCRIPTION OF THE PREFERRED EMBODIMENTS

In the following, embodiments for carrying out the present invention will be described by referring to the accompanying drawings.

The embodiments of the invention may be applied to a method and an apparatus for extracting a raster image in a portable electronic document. Formats of the portable electronic documents include a portable electronic document format (PDF) and PostScript (PS) format developed by Adobe (Trademark) systems Inc. The extracted raster images are reused in other documents or for a document search.

In the following embodiments, a method and an apparatus for extracting a raster image from a PDF file are described; however, it is obvious for a person having ordinary skill in the art that the raster image may be extracted from other types of portable electronic documents.

Figure 1:
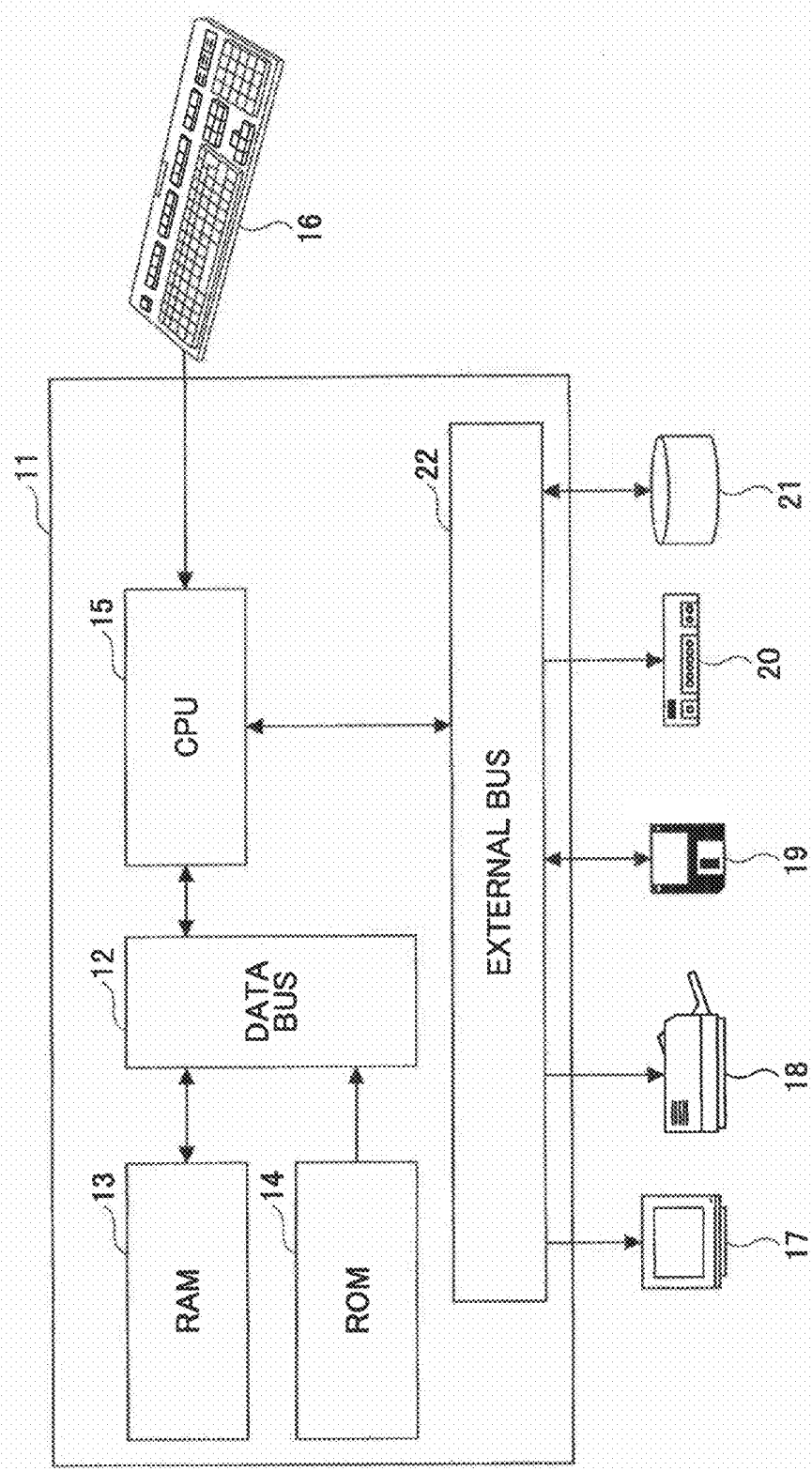
FIG. 1 is a hardware configuration of a computer system extracting raster images from a portable electronic document according to an embodiment of the invention.

FIG. 1 is a hardware configuration of a computer system that extracts a raster image from a portable electronic document according to an embodiment of the invention. As illustrated in FIG. 1, a computer system 10 configured to extract the raster image from the PDF file includes a computer 11, a keyboard 16, a monitor 17, a printer 18, a floppy disk drive 19, a network access connector 20, and a hard disk drive 21. The computer 11 includes a data bus 12, a RAM 13, a ROM 14, a CPU 15, and a peripheral bus 22.

The CPU 15 controls reception and processing of input data, and output data to the monitor 17 or other peripherals based on a command from the RAM 13. In this embodiment, the CPU 15 carries out processing on an input PDF file to extract raster images contained in the PDF file. The extracted raster images may be used by other applications controlled by the CPU 15. The CPU 15 has access to the RAM 13 and the ROM 14 via the data bus 12. Since the RAM 13 is used as a readable-writable memory, the RAM 13 is used as a work area for processing and a storage region for storing variable data. The ROM 14 stores PDF files, a process for extracting raster images, and a process for extracting other raster images.

The peripheral bus 22 is used for accessing the peripherals connected to the computer 11, such as an input device, an output device, and a storage device. The peripherals include the monitor 17, the printer 18, the floppy disk drive 19, the network access connector 20, and the hard disk drive 21. The monitor 17 displays output data and images transmitted from the CPU 15 via the peripheral bus 22. The monitor 17 may be a grid type (also called a "matrix type") display apparatus such as a cathode-ray tube (CRT) display or a liquid crystal display (LCD) apparatus. The printer 18 prints data or images input from the CPU 15 on sheets or sheet-like media. In order to display the PDF file containing the data and images on the output devices, the computer system 10 may need to convert the PDF file into a corresponding image. In other embodiments, an output device such as the printer 18 may be provided with a CPU or a processor functioning as the CPU so as to convert a PDF like file into a corresponding image. The floppy disk drive 19 and the hard disk drive 21 is used for storing the PDF files. The PDF files can be transferred between various computer systems via the floppy disk drive 19, and the hard disk drive 21 can provide a larger capacity and faster access speeds for transferring the PDF files. The PDF files may be stored in other types of storage devices such as a flash memory to serve the computer system 10. The computer system 10 transmits data over a network and receives data from other computer systems via the network access connector 20. A user inputs a command to the computer system 10 via the keyboard 16, and the like.

Figure 2:
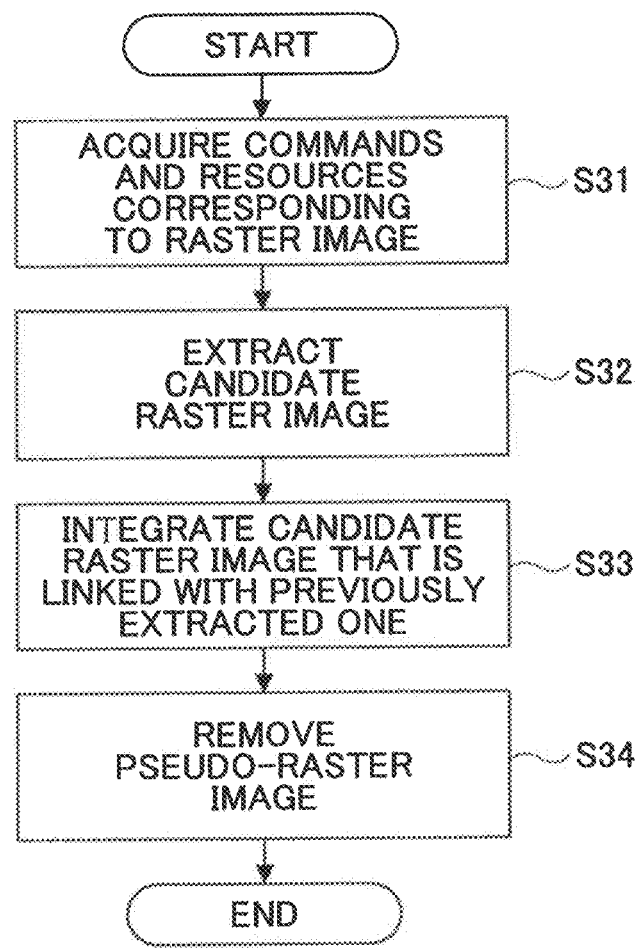
FIG. 2 is an overall flowchart illustrating a method for extracting the raster images from the portable electronic document according to the embodiment.

FIG. 2 is an overall flowchart illustrating a method for extracting raster images from the portable electronic document according to the embodiment. As illustrated in FIG. 2, according to the embodiment, the method for extracting a raster image from the PDF document overall includes steps S31 through S34; that is, acquiring a command and a resource related to raster images in question (step S31), extracting candidate raster images from the PDF document (step S32), integrating linked candidate raster images (step S33), and removing pseudo-raster images (step S34). Specifically, in step S31, the PDF file is loaded in the memory, and commands and resources are acquired corresponding to raster images in each page by analyzing the PDF file. In step S32, the acquired command and resource are processed so that candidate raster images are extracted. Thereafter, the extracted candidate raster images are stored in a candidate raster image list. Note that the term "extract" herein includes computation of positions and sizes of the raster image, and decryption of the raster image based on a PDF file specified image encryption system. In the PDF file, there are two types of raster images, namely, an Image XObject and an Inline image. In this embodiment, two types of raster images are individually processed and stored in corresponding candidate raster image lists. In step S33, the small raster images contained in the candidate raster image list are compared, those small raster images that are linked are selected, and the selected linked raster images are then integrated to form a large raster image. In step S34, long and thin raster images indicating partition lines of the candidate raster image list and boarders in a table are finally removed.

Figure 3:
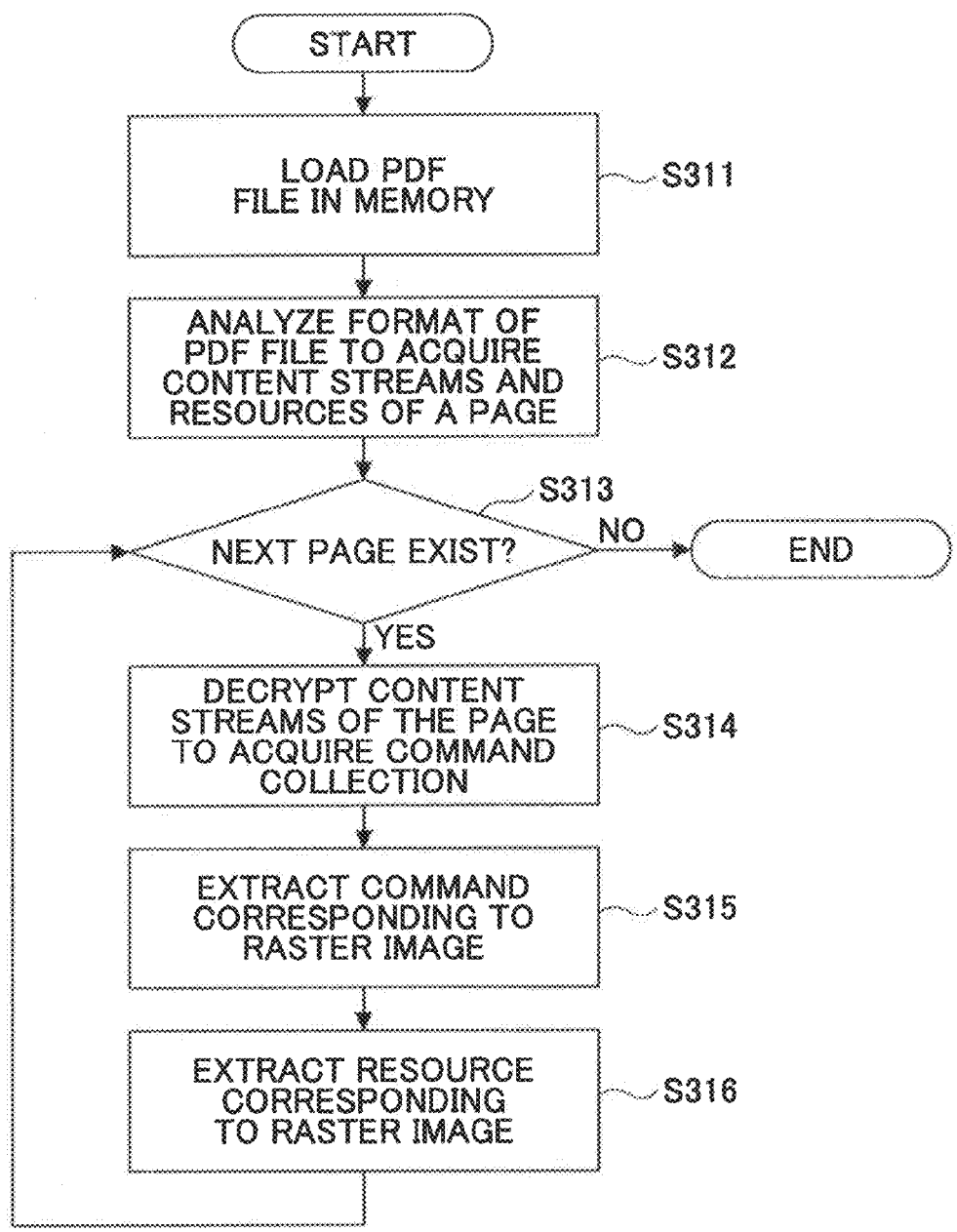
FIG. 3 is a flowchart illustrating a method for extracting commands and resources corresponding to the raster images from the portable electronic document according to the embodiment.
Figure 7:
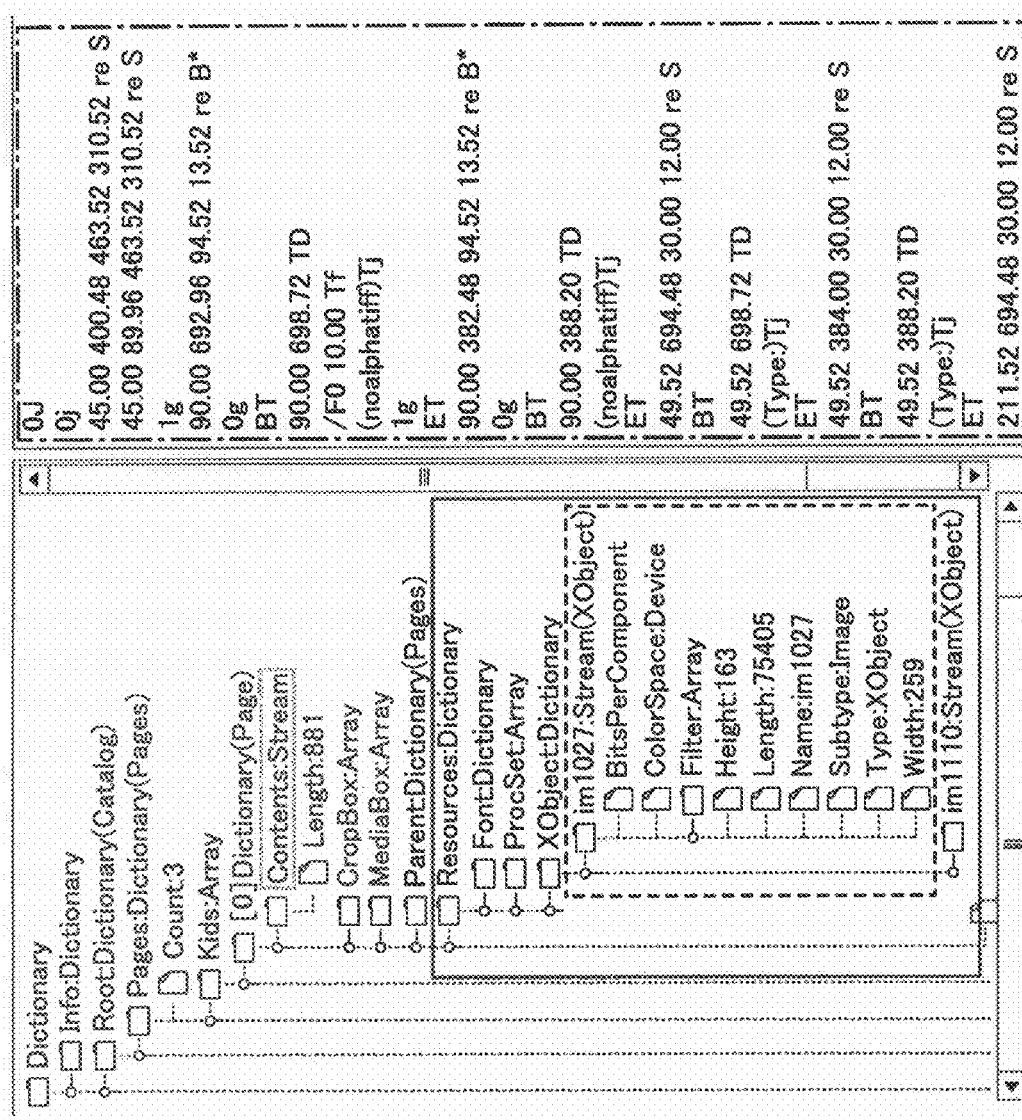
FIG. 7 is a diagram illustrating an example of a tree type document configuration and content streams of the PDF file.

FIG. 3 is a flowchart illustrating a method for extracting commands and resources related to the raster images from the PDF file, that is, the flowchart of step S31 according to the embodiment. As illustrated in FIG. 3, in a process of extracting commands and resources corresponding to the raster images, the PDF file is loaded into the memory in step S311, and a format of the PDF file is analyzed to form a tree-shaped file structure in step S312. With the tree-shaped file structure, the contents stream section and the resources section of each page of the file can be easily accessed and acquired. For example, FIG. 7 illustrates an example of the tree-shaped file structure and content streams of a page of the PDF file. A portion enclosed by an outer frame on a left side of FIG. 7 illustrates the resources of the document on the first page, a portion enclosed by an inner frame on the left side of FIG. 7 illustrates an image resource of the first page, and a portion enclosed by a frame on a right side of FIG. 7 illustrates content stream segments corresponding to the content streams of the first page. Next, in step S313, content streams and resources of each page of the PDF file are sequentially loaded, and whether a current page is the last page of the PDF file is determined. If the current page is not the last page, loading of the content streams and resources of each page of the PDF file is repeated. The loading is repeated until the last page of the PDF file is reached. In step S314, the content streams of the corresponding page are decrypted based on an encryption system adopted for the PDF file. The specification of the PDF file (i.e., defines stipulations to be complied) describes that the PDF file supports various encryption systems of the content streams such as FlateDecode, LZWDecode, and the like. In step S314, the content streams of the corresponding page are decrypted based on the encryption adopted by the PDF file. The decrypted content streams are composed of a collection of the PDF commands. In step S315, commands of the decrypted PDF content streams are analyzed for each line so as to extract commands corresponding to raster images from the collection of the PDF commands. The PDF file specification defines a different storage mechanism and a display command for each of Image XObjects and Inline-images. For example, a command "cm 100 0 0 100 40 90" controls a starting point of a raster image "40, 90", and a display size of the image "100*100", and a command "Do Img1" displays an Image XObject raster image Img1 based on the position and the size specified by the command "cm 100 0 0 100 40 90". Image data corresponding to the Image XObject raster image Img1 are stored in the resources of a corresponding page. A command "BI" initiates forming an Inline-image, a command "ID" displays Inline-image data, and a command "EI" indicates the end of the inline-image data and displays the corresponding inline-image. The inline-image data differs from the Image XObject data in the following point. That is, the inline-image data are directly stored in the contents stream section of the corresponding page, and thus are not extracted from the resources section of the corresponding page but extracted directly from the contents stream section of the corresponding page. Accordingly, in step S316, if the raster image is the Image XObject image, a corresponding raster image resource for each page is extracted from the resources, whereas if the raster image is the inline-image, a corresponding raster image resource is extracted from the decrypted content streams.

Figure 4:
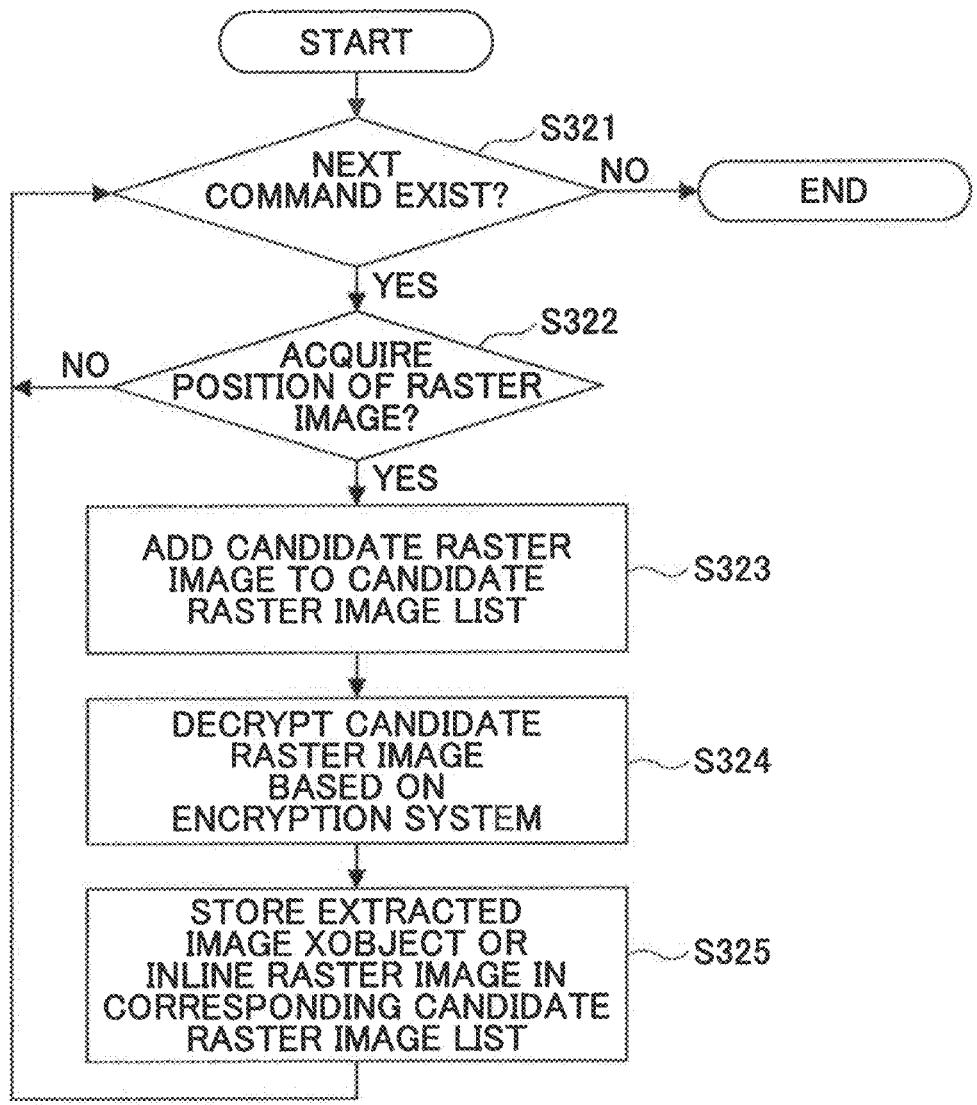
FIG. 4 is a flowchart illustrating a method for extracting candidate raster images from the PDF file according to the embodiment.

FIG. 4 is a flowchart illustrating a method for extracting candidate raster images from the PDF file, which is the flowchart of step S32 according to the embodiment. As illustrated in FIG. 4, in step S321, commands of the raster images extracted for each line are loaded.

In step S322, which one of the following image display commands is used for the extracted raster image of the corresponding line is determined.

According to the PDF file specification, a display command corresponding to Image XObject is "Do", and that corresponding to Inline image is "EI". The respective image display commands are used in displaying one raster image on a PDF page face. In step S323, information on the position and size of the candidate raster image corresponding to a current command is acquired. In the PDF file, the information on the position and size of the above candidate raster image is determined based on the affine transformation defined by a command "cm a b c d e f". In this command, "cm" represents a display command, and "a b c d e f" represents parameters. Parameters "a b c d" represent the image size and rotational information, and parameters "e f" represent coordinates of the starting point of the corresponding image on the page.

For example, in the command "cm 100 0 0 100 40 90", a starting point of the raster image is represented by "40 90", the image size is "100*100", and a rotational angle is "0". In step S324, the candidate raster image is decrypted into image data based on the specified encryption system of the PDF file so as to extract the raster image based on the corresponding image data. The decryption type of Image XObject is stored in the corresponding resources section whereas the decryption type of Inline-image is stored in a pair of commands "BI" and "EI" in the contents stream section of the page. In step S325, the extracted Image XObject raster image and extracted Inline raster image are stored in corresponding candidate raster image lists.

Figure 5:
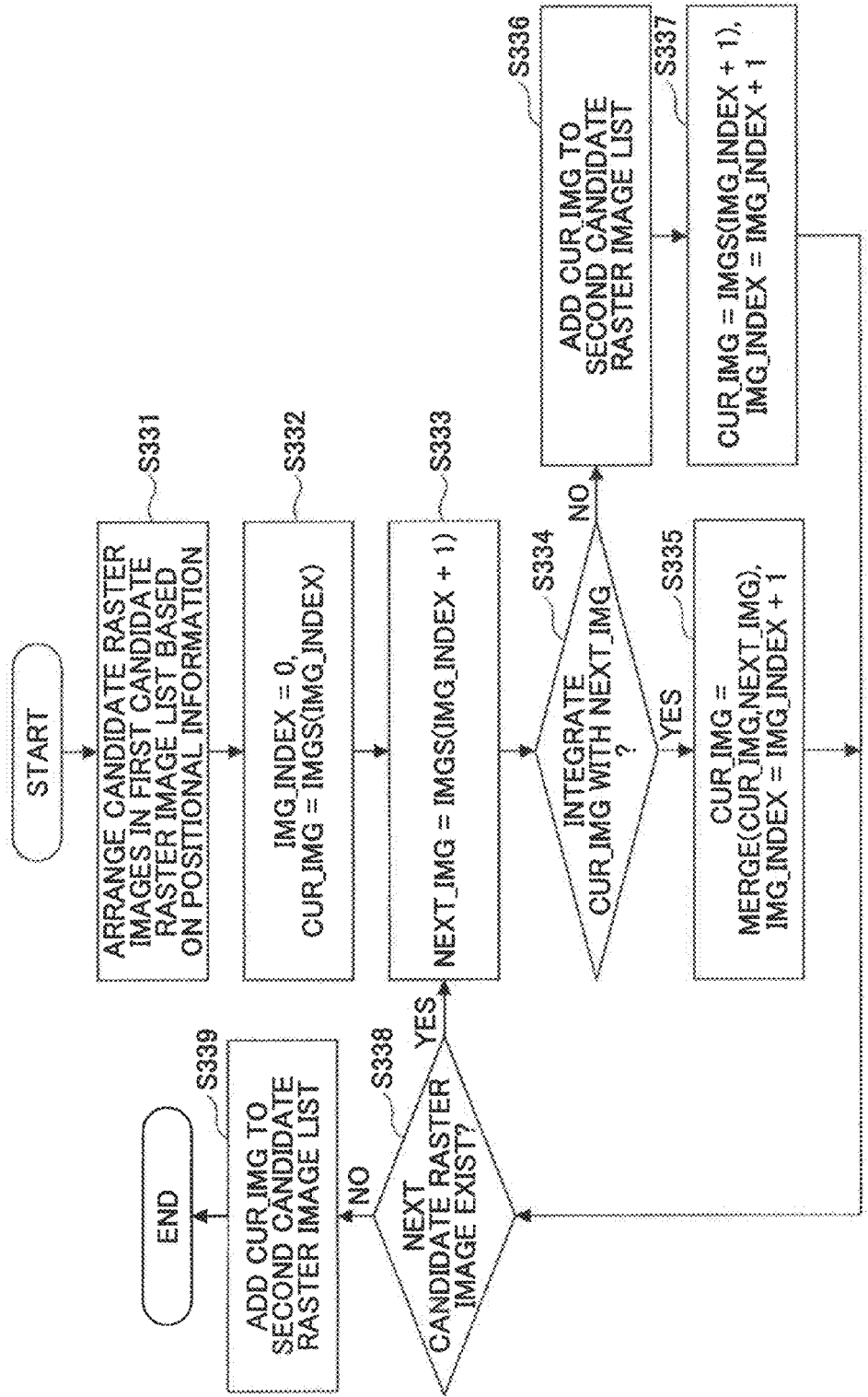
FIG. 5 is a flowchart illustrating a method for integrating linked candidate raster images from the portable electronic document according to the embodiment.

FIG. 5 is a flowchart illustrating a method for integrating linked candidate raster images, that is, the flowchart of step S33 according to the embodiment, in which small raster images that are linked together are integrated into a large raster image. In the PDF file, a visually intact image is generally composed of small raster images that are linked together. The Image XObject raster image and Inline raster image are stored in the different candidate raster image lists, based on a corresponding one of which the small raster images that are linked are integrated into a large raster image. In step S331, the candidate raster images are arranged in a candidate raster image list (herein after called original or first candidate raster image list) based on the positional information contained in themselves. In this step, a first image is arranged to have coordinates of a starting point closest to those of a starting point of the PDF page face, a second image is arranged to have coordinates of a starting point closest to those of the starting point of the first image, and the rest of the images in the first candidate raster image list are arranged in similar analogical manners. In step S332, an image indicator parameter IMG_INDEX is initialized to "0", and the image indicator parameter IMG_INDEX is set to a first image CUR_IMG in the first candidate raster image list. In step S333, an image indicator parameter IMG_INDEX+1 is set to a second image NEXT_IMG in the first candidate raster image list; that is, a second image NEXT_IMG is located adjacent to the first image CUR_IMG in the first candidate raster image list. In step S334, whether the first image CUR_IMG and the second image NEXT_IMG are linked is determined by comparing positional information of the first and second images CUR_IMG and NEXT_IMG. If the first and second images CUR_IMG and NEXT_IMG are found to be located close to each other in a vertical direction; that is, the difference in the position between the first and second images CUR_IMG and NEXT_IMG is lower than a first predetermined threshold, and the first and second images CUR_IMG and NEXT_IMG have an overlapped portion having a length exceeding a second threshold in a horizontal direction, the first and second images CUR_IMG and NEXT_IMG are determined as the linked images. In this embodiment, for example, if the conditions "gap<thre_gap", and "overlapping/min (width 1, width 2)>thre_overlapping" are satisfied, the first and second images are determined as linked images; however, if such conditions are not satisfied, the first and second images are determined as unlinked images.

Figure 9:
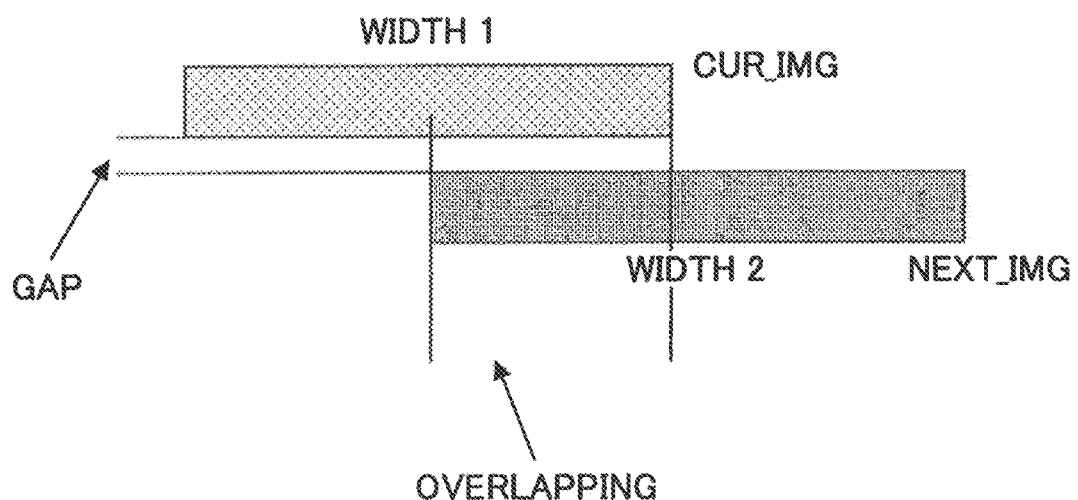
FIG. 9 is a schematic diagram illustrating parameters for determining whether the candidate raster images are linked.

As illustrated in FIG. 9, parameters width 1, width 2, gap, and overlapping respectively represent a width of the first image CUR_IMG, a width of the second image NEXT_IMG, a distance between the first and second images CUR_IMG and NEXT_IMG in the vertical direction, and an overlapping region between the first and second images CUR_IMG and NEXT_IMG in the horizontal direction. The first threshold thre_gap and the second threshold thre_overlapping may be set based on various applications such as "thre_gap=2, thre_overlapping=0.4". When the first and second images CUR_IMG and NEXT_IMG are determined as linked images in step S334, the first and second images CUR_IMG and NEXT_IMG are integrated in step S335. At the same time, an integrated image is newly determined as the first image CUR_IMG in the first candidate raster image list, and the corresponding image indicator parameter IMG_INDEX, which is initially set to the first image CUR_IMG in the original first candidate raster image list, is changed to IMG_INDEX+1. Herein, the above integration of images includes information on integration of image positions, image sizes, and image data. In this embodiment, the position of the integrated image of the first and second images is computed by the following equations (1) through (4).

$$new\_startx = min(start\_x1, start\_x2) \quad (1)$$

$$new\_starty = min(start\_y1, start\_y2) \quad (2)$$

$$new\_endx = max(end\_x1, end\_x2) \quad (3)$$

$$new\_endy = max(end\_y1, end\_y2) \quad (4)$$

In the above equations (1) through (4), new_startx represents coordinates of a starting point in an x direction of the integrated raster image, new_starty represents those of a starting point in a y direction of the integrated raster image, new_endx represents coordinates of an end point in the x direction of the integrated raster image, and new_endy represents those of an end point in the y direction of the integrated raster image; start_x1 represents coordinates of a starting point in the x direction of the first raster image before integration, start_y1 represents those of a starting point in the y direction of the first raster image before integration, end_x1 represents coordinates of an end point in the x direction of the first raster image before integration, and end_y1 represents those of an endpoint in the y direction of the first raster image before integration; and start_x2 represents coordinates of a starting point in the x direction of the second raster image before integration, start_y2 represents those of a starting point in the y direction of the second raster image before integration, end_x2 represents coordinates of an end point in the x direction of the second raster image before integration, and end_y2 represents those of an end point in the y direction of the second raster image before integration.

Figure 8B:
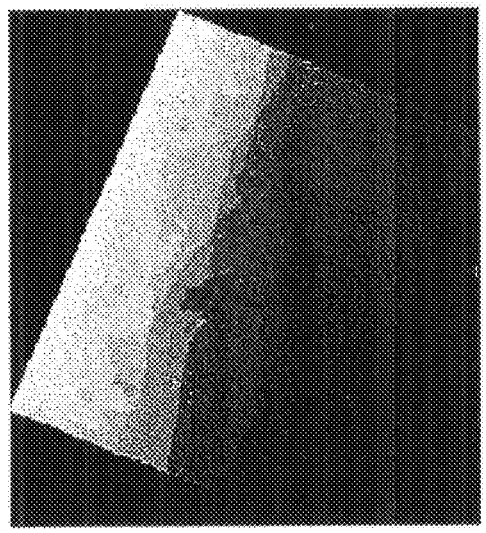
Figure 8A:
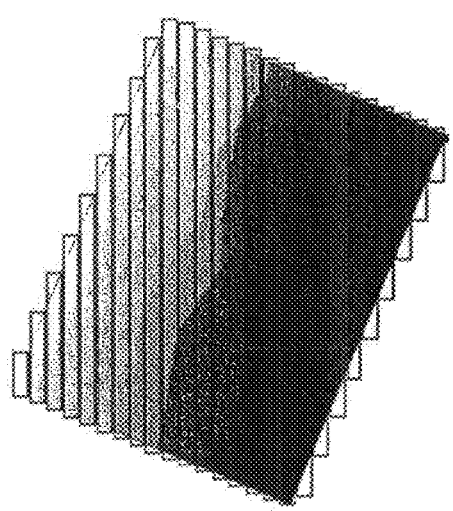

In the integration process, the first and second candidate raster images are placed at corresponding positions of the candidate integrated raster image, and space remaining around the integrated candidate raster image where no images are placed is rendered with black pixels. In contrast, if the first and second images CUR_IMG and NEXT_IMG are determined as unliked images in step S334, the first image CUR_IMG is added to another candidate raster image list called a "second candidate raster image list" differing from the first candidate raster image list in step S336. In step S337, an image indicator parameter IMG_INDEX+1 is set to the first image CUR_IMG in the original first candidate raster image. In step S338, whether there is any image left in the first candidate raster image list is determined. If there is, the process goes to step S333, but if there is no image left in the first candidate raster image list, the process goes to step S339, where the first CUR_IMG is added to the second candidate raster image list and ends the process. The Image XObject and the Inline image are both subject to the image integration process, and integration processing on the Image XObject and the Inline image are carried out separately. FIG. 8A illustrates plural raster images before integration and FIG. 8A illustrates an image after integrating the plural raster images.

Figure 6:
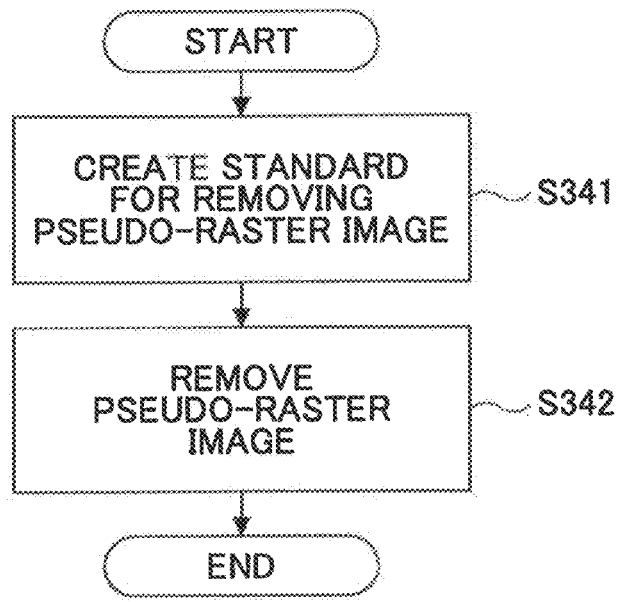
FIG. 6 is a flowchart illustrating a method for removing pseudo-raster images from the portable electronic document according to the embodiment.

FIG. 6 is a flowchart illustrating a method for removing pseudo raster images, which are composed of long and thin raster images in the newly created second candidate raster image list; that is, the flowchart of step S334 in FIG. 2. With the PDF file, a raster image may include borderlines or symbols of a document. However, these raster images of borderlines or symbols include perceptually insignificant characteristics for detection or search; that is, the borderlines or symbols are undesired to be extracted from the PDF file. In step S341, whether the long and thin images in the second candidate raster image list are deleted is determined based on the following condition (5) as a standard. First, a first threshold thre1 is computed based on the size of the page face and size of the smallest character in the page. For example, when the height of the page face is page_height, the height of a smallest character in the page is smallest_char_height, thre1=max (page_height/100, smallest_char_height). Note that a second threshold thre2 and a third threshold thre3 may be set as thre2=0.1, and thre3=10, based on a ratio of the height to the width of the raster image.

$$(Width < thre1 \text{ and } height < thre1) \text{ or}$$
$$((width < thre1 || height < thre1) \&\& (width/height < thre2 || width/height > thre3)) \quad (5)$$

In step S342, if the height and width of a raster image satisfy the above condition (5), the raster image is determined as a pseudo-raster image and deleted. Thereafter, remaining raster images arranged in the second raster image list are finally extracted raster images of the PDF file.

The method for extracting a raster image from a portable electronic document according to the embodiment may also be realized by an apparatus for extracting a raster image from a portable electronic document. The apparatus for extracting a raster image from a portable electronic document includes a document analysis device configured to analyze a format of a portable electronic document so as to acquire command and resources of the raster image for each page in step S31. The apparatus for extracting a raster image also includes a candidate raster image extraction device configured to process the command and the resources to extract a candidate raster image in step S32. The apparatus for extracting a raster image further includes a raster image integration device configured to integrate the candidate raster image that is linked together with a previously extracted candidate raster image in step S33. The apparatus for extracting a raster image still further includes a pseudo-raster image removal device configured to remove pseudo-raster images in step S34.

Specifically, the document analysis device includes an acquisition device configured to analyze a format of a portable electronic document so as to acquire content streams and resources of the raster image for each page in step S312. The document analysis device further includes a decryption device configured to decrypt the content streams so as to acquire a command collection in step S314. The document analysis device further includes a command extraction device configured to extract a command corresponding to the raster image from the command collection in step S315. The document analysis device further includes a resource extraction device configured to extract the resource corresponding to the raster image in step S316.

In the apparatus for extracting a raster image, the candidate raster image extraction device is configured to process steps S322 to S325. Specifically, the candidate raster image extraction device specifies an image display command in the extracted command, extracts position and size information on a candidate raster image, decrypts the candidate raster image based on an encryption system for the portable electronic document, and the decrypted raster image is stored in a candidate raster image list in steps S322 to S325.

In the apparatus for extracting a raster image, the raster image integration device includes an arrangement device configured to arrange the candidate raster image in the candidate raster image list based on the position and size information on the candidate raster image in steps S331 through S333. The raster image integration device further includes a determination device configured to process steps S334 and S335. Specifically, the determination device compares respective positions of first and second candidate raster images adjacently arranged in the candidate raster image list, determines that the first and second candidate raster images are linked candidate raster images if a distance between the first and second candidate raster images in a vertical direction is below a first predetermined threshold and if an overlapped area of the first and second candidate raster images in a horizontal direction exceeds a second predetermined threshold, and integrates the linked first and second candidate raster images as an integrated candidate raster image. Thereafter, the determination device determines whether the integrated candidate raster image is linked with a subsequent candidate raster image and integrates, if they are linked, the integrated candidate raster image and the subsequent candidate raster image. The raster image integration device further includes an addition device configured to add the first candidate raster image or the integrated candidate raster image in a second candidate raster image list if the first candidate raster image is not linked with the second candidate raster image or if the integrated candidate raster image is not linked with the subsequent candidate raster image in steps S336 and S337.

In the above embodiments, the method and the apparatus for extracting a raster image from a PDF file are described using the PDF file format as examples; however, it is obvious for a person having ordinary skill in the art that the present invention may be applicable to any other portable electronic documents regardless of any specific characteristics of the PDF file. The sequence of operations and steps described above may be implemented by the hardware, software, or a combination of the hardware and software. For example, a computer program having the sequence of operations or steps may be stored in a storage medium such as a hard disk or a ROM, or temporarily or permanently in a removable storage medium such as a floppy disk, a CD-ROM, a MO, a DVD, a Disk, and a semiconductor memory.

In the following, various advantages of the disclosed embodiments will be noted. The above embodiments may be applied to various fields including a document processing field or a document comprehension field such as document content extraction, document reuse, and document search. For example, extraction of raster images may be applied to a document reuse or document search system.

In the above embodiments, the raster image is extracted from the portable electronic document by analyzing the format of the portable electronic document. Accordingly, the raster image formed of any of the Inline raster image and the Image XObject raster image may be extracted, and moreover, the visually intact raster image can be extracted from the portable electronic document without long and thin boarder lines that are perceptually insignificant.

The descriptions of exemplary embodiments for implementing the invention have been provided heretofore. The present invention is not limited to these embodiments, but various variations and modifications may be made without departing from the scope of the present invention.

The present application is based on Chinese priority application No. 200910141741 filed on May 25, 2009, with the Chinese Patent Office, the entire contents of which are hereby incorporated by reference.

What is claimed is:

1. A method for extracting a raster image of a page from a portable electronic document, comprising:
    (a) acquiring commands and resources of the raster image of the page by analyzing a format of the portable electronic document;
    (b) extracting first and second candidate raster images by processing the commands and the resources of the raster image of the page;
    (c) integrating the first and second candidate raster images as an integrated candidate raster image provided that the first and second candidate raster images are linked together; and
    (d) removing a pseudo-raster image from the integrated candidate raster image,
    wherein the step (b) includes:
    (b1) specifying an image display command in the acquired commands of the raster image of the page in the step (a);
    (b2) extracting positional and size information on the first and second candidate raster images by processing the commands of the raster image of the page based on the specified image display command in the step (b1);
    (b3) decrypting the first and second candidate raster images based on a decryption system specified for the portable electronic document; and
    (b4) storing the decrypted first and second candidate raster images in a first candidate raster image list.

2. The method as claimed in claim 1, wherein the step (a) includes:
    (a1) acquiring content streams and the resources of the raster image of the page by analyzing the format of the portable electronic document;
    (a2) acquiring a collection of commands by decrypting the acquired content streams of the raster image of the page;
    (a3) extracting a raster image command from the acquired collection of commands; and
    (a4) extracting a raster image resource from one of the acquired resources in the step (a1) or the acquired collection of commands in the step (a2).

3. The method as claimed in claim 1, wherein the step (c) includes:
    (c1) adjacently arranging the first and second candidate raster images based on respective positions thereof in the first candidate raster image list;
    (c2) comparing the respective positions of the first and second candidate raster images adjacently arranged in the first candidate raster image list, determining that the first and second candidate raster images are linked candidate raster images provided that a distance between the first and second candidate raster images in a vertical direction is below a first predetermined threshold and provided that an overlapped area of the first and second candidate raster images in a horizontal direction exceeds a second predetermined threshold, and integrating the linked first and second candidate raster images as an integrated candidate raster image;
    (c3) repeating the step (c2) on the integrated candidate raster image and a third candidate raster image arranged adjacent to the integrated candidate raster image; and
    (c4) adding the first candidate raster image to a second candidate raster image list provided that the first candidate raster image is not linked with the second candidate raster image, or adding the integrated candidate raster image to the second candidate raster image list provided that the integrated candidate raster image is not linked with the third candidate raster image.

4. The method as claimed in claim 3, wherein the process of the integrating the linked first and second candidate raster images as the integrated candidate raster image in the step (c2) includes integrating respective image positions, respective image sizes, respective image data units of the first and second candidate raster images, and rendering space remaining around the integrated image with black pixels.

5. The method as claimed in claim 1, wherein in the step (d), whether the integrated candidate raster image composed of the first and second candidate raster images includes a pseudo-raster image is determined based on a smallest character size of, and a ratio of a height to a width of, one of the first and second candidate raster images in the integrated candidate raster image of the page.

6. An apparatus for extracting a raster image of a page from a portable electronic document, comprising:
 a document analysis device configured to acquire commands and resources of the raster image of the page by analyzing a format of the portable electronic document;
 a candidate raster image extraction device configured to extract first and second candidate raster images by processing the commands and the resources of the raster image of the page;
 a raster image integration device configured to integrate the first and second candidate raster images as an integrated candidate raster image provided that the first and second candidate raster images are linked together; and
 a pseudo-raster image removal device configured to remove a pseudo-raster image from the integrated candidate raster image,
 wherein the candidate raster image extraction device specifies an image display command in the acquired commands of the raster image of the page, extracts position and size information on the first and second candidate raster images, decrypts the first and second candidate raster images based on an encryption system for the portable electronic document, and stores the first and second candidate raster images in a first candidate raster image list.

7. The apparatus as claimed in claim 6, wherein the document analysis device includes:
 an acquisition device configured to acquire content streams and the resources of the raster image of the page by analyzing the format of the portable electronic document;
 a decryption device configured to acquire a collection of commands by decrypting the acquired content streams of the raster image of the page;
 a command extraction device configured to extract a raster image command from the acquired collection of commands acquired by the decryption device; and
 a resource extraction device configured to extract a raster image resource from one of the acquired resources acquired by the acquisition device or the acquired collection of commands acquired by the decryption device.

8. The apparatus as claimed in claim 6, wherein the candidate raster image extraction device includes:
 an arrangement device configured to adjacently arrange the first and second candidate raster images based on respective positions thereof in the first candidate raster image list;
 a determination device configured to compare respective positions of the first and second candidate raster images adjacently arranged in the first candidate raster image list, to determine that the first and second candidate raster images are linked candidate raster images provided that a distance between the first and second candidate raster images in a vertical direction is below a first predetermined threshold and provided that an overlapped area of the first and second candidate raster images in a horizontal direction exceeds a second predetermined threshold so as to integrate the linked first and second candidate raster images as a first integrated candidate raster image, to determine that the first integrated candidate raster image is linked with a third candidate raster image provided that a distance between the first integrated candidate raster image and the third candidate raster image in a vertical direction is below the first predetermined threshold and provided that an overlapped area of the first integrated candidate raster image and the third candidate raster image in a horizontal direction exceeds the second predetermined threshold so as to integrate the first integrated candidate raster image and the third candidate raster image as a second integrated candidate raster image provided that the first integrated candidate raster image and the third candidate raster image are linked; and
 an addition device configured to add the first candidate raster image to a second candidate raster image list provided that the first candidate raster image is not linked with the second candidate raster image, and to add the first integrated candidate raster image to the second candidate raster image list provided that the first integrated candidate raster image is not linked with the third candidate raster image.

9. The apparatus as claimed in claim 8, wherein the integrating of the linked first and second candidate raster images as the first integrated candidate raster image or the integrating of the linked first integrated candidate raster image and the third candidate raster image as the second integrated candidate raster image performed by the candidate raster image extraction device includes integrating respective image positions, respective image sizes, respective image data units of the first and second candidate raster images, and rendering space remaining around the first or the second integrated candidate raster image with black pixels.

10. The apparatus as claimed in claim 6, wherein the pseudo-raster image removal device determines whether the integrated candidate raster image composed of the first and second candidate raster images includes a pseudo-raster image based on a smallest character size of and a ratio of a height to a width of one of the first and second candidate raster images in the integrated candidate raster image of the page.

11. A method for extracting a raster image of a page from a portable electronic document, comprising:
 (a) acquiring commands and resources of the raster image of the page by analyzing a format of the portable electronic document;
 (b) extracting first and second candidate raster images by processing the commands and the resources of the raster image of the page;
 (c) integrating the first and second candidate raster images as an integrated candidate raster image provided that the first and second candidate raster images are linked together; and
 (d) removing a pseudo-raster image from the integrated candidate raster image,
 wherein the step (c) includes:
 (c1) adjacently arranging the first and second candidate raster images based on respective positions thereof in a first candidate raster image list;
 (c2) comparing the respective positions of the first and second candidate raster images adjacently arranged in the first candidate raster image list, determining that the first and second candidate raster images are linked candidate raster images provided that a distance between the first and second candidate raster images in a vertical direction is below a first predetermined threshold and provided that an overlapped area of the first and second candidate raster images in a horizontal direction exceeds a second predetermined threshold, and integrating the linked first and second candidate raster images as an integrated candidate raster image;

(c3) repeating the step (c2) on the integrated candidate raster image and a third candidate raster image arranged adjacent to the integrated candidate raster image; and (c4) adding the first candidate raster image to a second candidate raster image list provided that the first candidate raster image is not linked with the second candidate raster image, or adding the integrated candidate raster image to the second candidate raster image list provided that the integrated candidate raster image is not linked with the third candidate raster image.

12. The method as claimed in claim 11, wherein the process of the integrating the linked first and second candidate raster images as the integrated candidate raster image in the step (c2) includes integrating respective image positions, respective image sizes, respective image data units of the first and second candidate raster images, and rendering space remaining around the integrated image with black pixels.

* * * * *